July 18, 1933.   R. H. CHILTON   1,918,520

STEERING MECHANISM FOR AUTOMOBILES

Filed May 2, 1930

Inventor
Ralph H Chilton
By Spencer Hardman & Fehr
his Attorneys

Patented July 18, 1933

1,918,520

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

STEERING MECHANISM FOR AUTOMOBILES

Application filed May 2, 1930. Serial No. 449,342.

This invention relates to the steering gear for automotive vehicles and the like and is especially useful as a joint between a steering drag link and an actuating pitman therefor, whereby to reduce or prevent the phenomena known as "front wheel shimmy" in present day automobiles.

An object of the invention is to provide a strong, simple, and efficient swivel joint between a pitman and a thrust link which will cause a small translation of said link relative to said pitman upon a change of angularity between said link and pitman.

A more specific object is to provide such a joint between the actuating pitman and the drag link which causes the steering movement of the front wheels of an automobile, whereby the front end of the drag link may move freely up and down in the substantially arcuate path prescribed therefor by the front leaf spring without causing "front wheel shimmy" and allied phenomena.

Further objects and advantages of the present invention will be apparent from the following description, reference being had to the accompanying drawings wherein a preferred embodiment of one form of the present invention is clearly shown.

Figure 1:
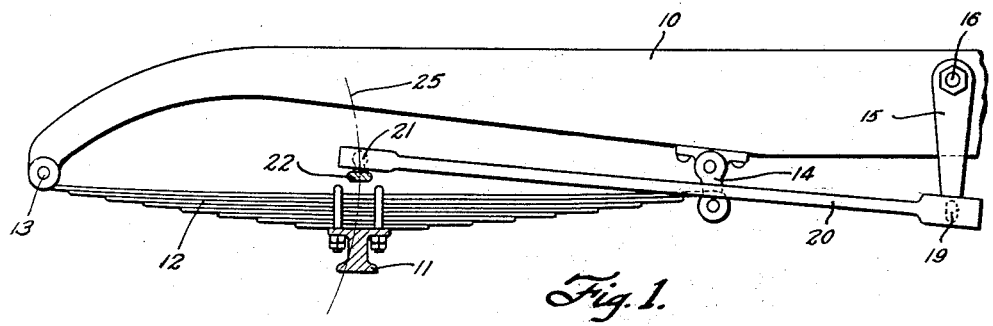
Fig. 1 is a diagrammatic view illustrating the use of this invention on a steering gear of a present day automobile.

10 designates the front end of the left chassis side rail and 11 the front wheel axle. The left front leaf spring 12 is fixed to the axle 11 in any usual or suitable manner and has a pivot shackle 13 connecting its front end to the side rail 10 and an extension shackle 14 connecting its rear end thereto. The steering pitman 15 is mounted upon a transverse shaft 16 which is rotated by the driver through any suitable and well known form of mechanism which need not be here illustrated. The drag link 20 connects the lower end of pitman 16 to the ball 21 on the end of the arm 22 which projects inwardly from the steering knuckle for the left front wheel. The swinging of pitman 15 in a vertical plane will obviously move link 20 in a fore and aft direction which will obviously rotate the steering knuckle about its substantially vertical knuckle pin and cause steering movement of the front wheels. The mechanism so far described is exceedingly well known and hence needs no further disclosure here.

Due to the fact that the leaf spring 12 is preferably pivoted to rail 10 at its front end 13 as shown in Fig. 1, when the front spring 12 is flexed for any reason the left front wheel together with its steering knuckle and ball 21 is constrained to move up or down in an approximately arcuate path with point 13 as a center as seen in the projected view shown in Fig. 1. The substantially arcuate line 25 in Fig. 1 designates the path of movement of the center of ball 21 from its normal position which is preferably substantially in direct line between points 13 and 19 when the front wheels are in straight ahead position.

Fig. 1 shows ball 21 moved upward along path 25 from its normal position due to an up movement of axle 11. Hence when the left front wheel moves up or down from its normal position due to passing over a road irregularity, or for any other reason, there will be a tendency to pull the pitman 15 in a clockwise direction as seen in Fig. 1, or failing in that, there will be a force to bias the front wheels to turn to the right slightly, or in fact both tendencies occur simultaneously due to the sudden tension put upon the drag link 20. This action is thought to be the initial cause of various steering troubles, such as steering wheel kick, front wheel shimmy, front axle tramp, etc. which phenomena are now well known but the causes thereof undetermined.

Now the prime purpose of this invention is to provide a remedy for such steering troubles by providing a swivel joint between the pitman 15 and drag link 20 which automatically in effect extends the length of link 20 when its front end moves up or down due to ball 21 following the prescribed substantially arcuate path 25 so that little or no tension is put upon link 20 at such times.

Figure 2:
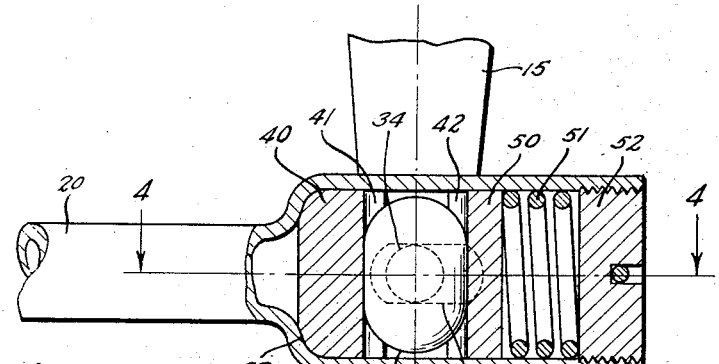
Fig. 2 is a vertical section through the joint connecting the end of the pitman with the rear end of the drag-link.
Figure 3:
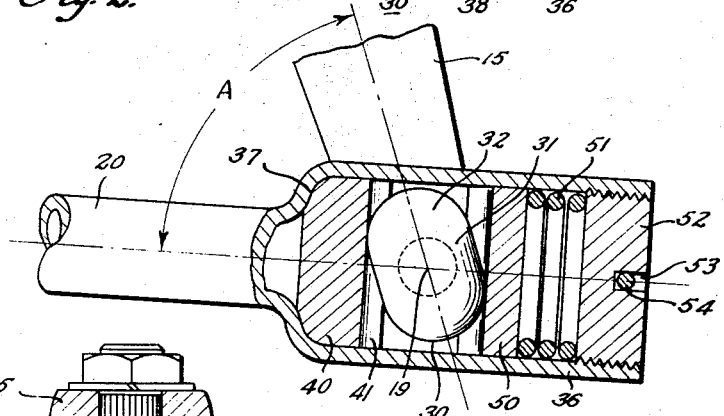
Fig. 3 is a view similar to Fig. 2 but shows the relative movement of the parts upon a change of the angle between the axes of the drag link and pitman.
Figure 4:
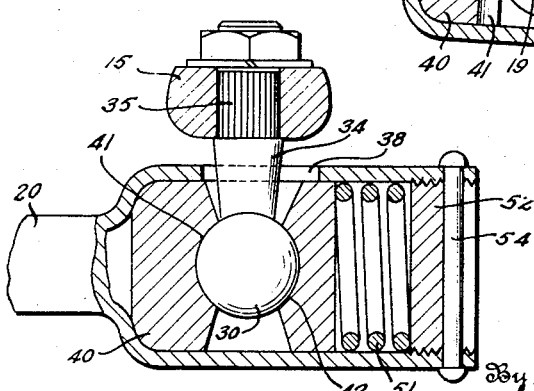
Fig. 4 is a horizontal section taken on line 4—4 of Fig. 2.

Figs. 2, 3 and 4 illustrate the swivel joint of this invention. Pitman 15 has an elongated cam 30 whose long axis extends vertically as shown. This cam 30 is preferably shaped as shown with a central cylindrical portion 31 and hemi-spherical end portions 32 (see Fig. 3). A shank 34 projects laterally from cam 30 and is rigidly fixed to the lower end of pitman 15 by any suitable means such as by the peripheral serrations 35 shown in Fig. 4. Link 20 has an enlarged tubular end 36 providing an internal shoulder 37 therein. A cam seat 40 is inserted within the tubular end 36 against shoulder 37. Seat 40 has a cylindrical cam surface 41 which fits snugly against the cylindrical portion 31 of cam 30 when the parts are in the position shown in Figs. 2 and 4, which occurs preferably when the front road wheels are in straight ahead position. After cam 30 is inserted through the open end of the tubular portion 36 and its shank 34 projected through the longitudinal slot 38 therein, the slidable cam seat 50 is inserted against cam 30 as shown in Fig. 2 and the strong coil compression spring 51 inserted and compressed thereagainst by the retaining plug 52 threaded into the end of portion 36. Plug 52 has a transverse slot 53 therein through which a cross pin 54 may be inserted to prevent loosening of the screw plug 52. The slidable cam seat 50 has a cylindrical cam surface 42 which corresponds to the radius of cam 30 as seen from Fig. 4.

In the operation of the device, when the front wheels are in straight ahead position cam 30 will have its cylindrical portion 31 engaging the opposed cam surfaces 41 and 42, as shown in Fig. 2. If now the left front wheel is moved either toward or down away from the side rail 10 due to the automobile passing over a road irregularity, the front end of drag link 20 will be raised or lowered according to the substantially arcuate path 25 of the ball 21. This obviously will change the angle "A" between the projected center lines of link 20 and pitman 15. Fig. 3 illustrates this angle "A" materially decreased and shows the action of the elongated cam 30 at such time. Cam 30 forces the cam seats 40 and 50 further apart against the urge of the compression spring 51 and in so doing the geometrical central point 19 of cam 30 moves along the axis of link 20 further away from cam surface 41. In other words the link 20 is translated bodily to the left (as shown in Fig. 1) relative to the center 19 of cam 30. The shape and dimensions of cam 30 are preferably so chosen that link 20 is translated or shifted to the left such an amount as will permit its front end to follow the prescribed path 25 shown in Fig. 1 without putting the link 20 under tension. However, any translation of link 20 according to this invention reduces the steering troubles mentioned hereinabove, that is, the translating movement need not be exact to be beneficial. If necessary the coil spring 51 may yield to permit the front end of link 20 to follow path 25.

For ordinary steering of the car by the driver, cam 30 moves the link 20 fore and aft in the manner of an ordinary ball and socket joint, the coil spring 51 being sufficiently strong to ordinarily move link 20 to the rear without further compression when it is desired to bias the front wheels to turn to the left. During such steering the camming action of cam 30 takes place but has a useful rather than harmful effect since the cam 30 will tend to stop when its cylindrical portion 31 is flat against the cam seats 41 and 42 (as shown in Fig. 2), that is, the steering mechanism will tend to return to and remain in the position for straight ahead running. The free horizontal swinging of the front end of link 20 is permitted by the rotation of the cylindrical surfaces 41 and 42 upon the cam 30 (see Fig. 4), the shank 34 moving in the slot 38 provided therefor in the tubular portion 36. It will be noted that when the angle "A" is as shown in Fig. 3, the spherical ends 32 of cam 30 will engage the cam surfaces 41 and 42 throughout their complete arcs. Hence there will always be sufficient bearing surfaces between cam 30 and its seats and also the horizontal swinging of link 20 will always be freely permitted.

While I have shown and described the joint of this invention as applied only at the rear end of the drag link it may be desired in some cases to substitute it for the ball and socket joint at the front end thereof instead, or it may be applied to both ends of the drag link, the action of each joint being the same as described in detail above.

While the form of embodiment of the present invention as herein disclosed, constitutes a preferred form, it is to be understood that other forms might be adopted, all coming within the scope of the claims which follow.

What is claimed is as follows:

1. In a steering gear for vehicles, a fore and aft extending drag link for steering the front wheels, a swinging pitman having a swivel joint with said drag link, said joint comprising: an elongated cam fixed to said pitman, a corresponding elongated cam seat fixed to said link and engaging one side of said elongated cam, a second cam seat retained in said link and means yieldably urging the second cam seat against the other side of said cam, whereby a change of angularity between said link and pitman causes a longitudinal translation of said link relative to said pitman.

2. In a steering gear for automotive vehicles, a drag link for actuating the steering movement of the front road wheels, a swinging pitman having a swivel joint with said drag link, said joint comprising: a cam fixed to the end of said pitman, a cam seat engaging one side of said cam and held fixed upon said link, a second cam seat engaging the other side of said cam and yieldably pressed thereagainst, said two cam seats engaging opposite sides of said cam longitudinally of said drag links, said cam and cam seats being so shaped that a change of angularity between said link and pitman causes a longitudial translation of said link relative to said pitman.

3. In a steering gear for automotive vehicles, a drag link for actuating the steering movement of the front road wheels, a swinging pitman having a swivel joint with said drag link, said joint comprising: a cam fixed to the end of said pitman, a cam seat engaging one side of said cam and held fixed upon said link, a second cam seat engaging the other side of said cam and yieldably pressed thereagainst, said two cam seats engaging opposite sides of said cam longitudinally of said drag links, said cam and cam seats being so shaped that a change of angularity between said link and pitman causes a separating movement between said cam seats resulting in a relative longitudinal translation of said link.

4. In a steering gear for automotive vehicles, a drag link for actuating the steering movement of the front road wheels, a swinging pitman having a swivel joint with said drag link, said joint comprising: an elongated cam circular in transverse section fixed to the end of said pitman, a cam seat circular in transverse section and engaging one side of said cam and fixed to said link, a second cam seat engaging the opposite side of said cam and yieldably forced thereagainst and supported by said link, said two cam seats engaging opposite sides of said cam longitudinally of said drag link, whereby a change of angularity between said link and pitman causes a longitudinal translation of said link relative to said pitman.

5. In a steering gear for automotive vehicles, a drag link for actuating the steering movement of the front road wheels, a swinging pitman having a swivel joint with said drag link, said joint comprising: an elongated cam having substantially partispherical ends fixed to said pitman, a cam seat cylindrical in transverse section engaging one side of said cam and fixed to said link, a second cam seat engaging the opposite side of said cam and yieldably forced thereagainst and supported by said link, said two cam seats engaging opposite sides of said cam longitudinally of said drag link, whereby a change of angularity between said link and pitman causes a relative longitudinal translation of said link and whereby a transverse swinging of said link is permitted without relative longitudinal translation of said link.

6. In a steering gear for automotive vehicles, a drag link for actuating the steering movement of the front road wheels, a swinging pitman having a swivel joint with said drag link, said joint comprising: an elongated cam fixed to said pitman so that the long axis of said cam extends substantially perpendicular to the link axis when the parts are in normal position, a corresponding elongated cam seat for said cam fixed to said link, means for yieldably forcing said link toward said elongated cam to cause pressure engagement of said cam and seat, whereby a change of angularity between said link and pitman causes a relative longitudinal translation of said link.

7. In combination, a swinging pitman, a thrust link, a universal swivel joint connecting said pitman and link comprising: an elongated cam fixed to said pitman, a corresponding elongated cam seat engaging one side of said cam and fixed to said link, means for yieldably forcing said link toward said cam to cause pressure engagement between said seat and cam, the long axis of said elongated cam and cam seat extending substantially perpendicular to the link axis, whereby a change of angularity between said link and pitman causes a longitudinal translation of said link relative to said pitman 8. In combination, a swinging pitman, a thrust link, a universal swivel joint connecting said pitman and link comprising: an elongated cam having substantially partispherical ends fixed to said pitman, an elongated cam seat cylindrical in transverse section engaging one side of said cam and fixed to said link, means for yieldably forcing said link toward said pitman to cause pressure engagement between said cam seat and cam, the long axis of said elongated cam and cam seat extending substantially perpendicular to the link axis, whereby a change of angle between said link and pitman causes a translation movement of said link relative to said pitman.

9. In combination, a swinging pitman, a thrust link, a universal swivel joint connecting said pitman and link comprising: an elongated cam fixed to said pitman, a cam seat engaging one side of said cam and fixed to said link, a second seat slidably supported by said link and yieldably forced against the other side of said elongated cam, the long axis of said elongated cam and cam seat extending substantially perpendicular to the link axis, whereby a change of angle between said link and pitman causes a translation of said link relative to said pitman.

10. In combination, a swinging pitman, a thrust link, a swivel joint connecting said pitman and link comprising: a cam fixed to one of said parts, a cam follower fixed to the other of said parts, and means for urging said cam and cam follower into pressure contact in a direction longitudinally of the axis of said link, said cam and follower being so associated as to force a translation of said link relative to said pitman upon a change of angle between said link and pitman.

RALPH H. CHILTON.